Figure 6:
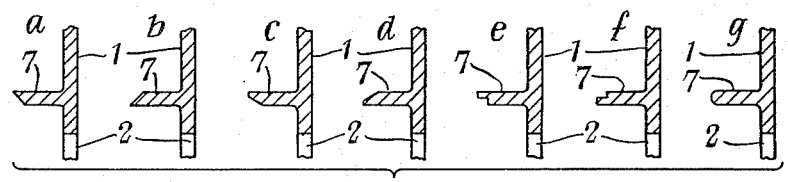

Aug. 27, 1957   R. G. WEST   2,803,962
FLUID-FLOW MEASURING DEVICES
Filed Aug. 22, 1955   3 Sheets-Sheet 1
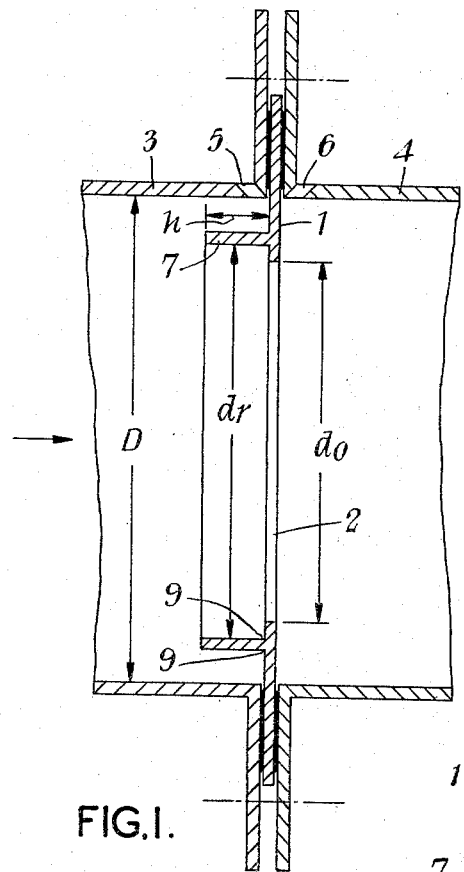
FIG.1.
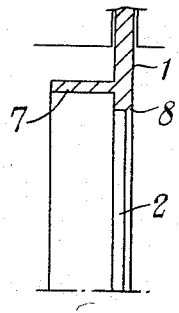
FIG.5.
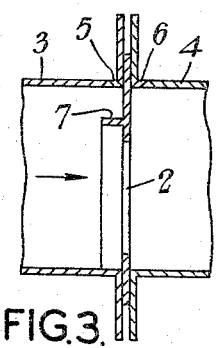
FIG.3.
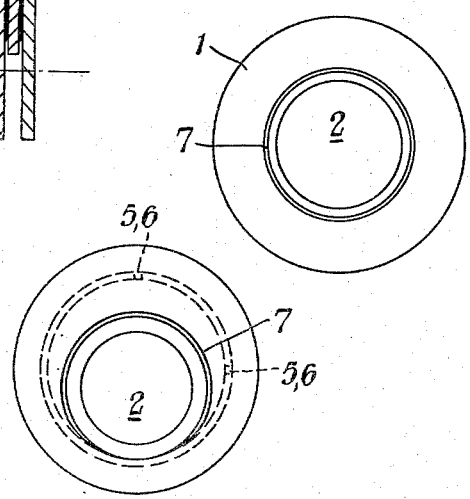
FIG.2.
FIG.4.
Inventor
Ralph George West
by Sommers & Young
Attorneys Aug. 27, 1957  R. G. WEST  2,803,962
FLUID-FLOW MEASURING DEVICES
Filed Aug. 22, 1955  3 Sheets-Sheet 2

Inventor
Ralph George West
by Sommers & Young
Attorneys

Aug. 27, 1957 R. G. WEST 2,803,962
FLUID-FLOW MEASURING DEVICES
Filed Aug. 22, 1955 3 Sheets-Sheet 3

Inventor
Ralph George West
by Sommers & Young
Attorneys 2,803,962
FLUID-FLOW MEASURING DEVICES Ralph George West, Park Royal, London, England, assignor to Electroflo Meters Company Limited, London, England Application August 22, 1955, Serial No. 529,736

Claims priority, application Great Britain August 24, 1954

7 Claims. (Cl. 73—211)

This invention concerns improvements relating to fluid-flow measuring devices of the kind, hereinafter referred to as of the kind set forth, comprising a restricted opening in a transverse wall in a conduit and one or more pressure offtakes enabling the pressure difference created by the said restricted opening to be measured. The invention is particularly concerned with improvements relating to devices comprising orifice plates and the like used for flow measurements in closed conduits such as pipes, but is also applicable to flume devices, weir plates and the like used in open conduits.

For flow measurements in closed conduits, the merits of devices comprising orifice plates on the one hand and nozzles or venturi tubes on the other hand have been the subject of considerable investigation, particularly as regards the characteristics of the discharge coefficient and the irrecoverable pressure losses. The said characteristics depend not only on the form of the device, but upon the range of Reynolds numbers to be considered and upon the velocity profile, i. e. the velocity distribution in the approaching fluid stream, which in turn is dependent upon boundary-layer conditions.

In devices with a nozzle or a venturi tube, there is a shaped inlet section, between upstream and throat pressure offtakes, which leads the fluid smoothly into the throat, giving a contraction coefficient very near unity. However, problems arise, with regard to stability or reliability of performance, from the variable influence which the contour of the inlet section and the contact between the fluid and the wall of that section exert upon the discharge coefficient. Moreover, the fact that the throat offtake is actually in the said wall increases its sensitivity to changing wall conditions, due to "ageing" for example. Furthermore, such devices are sensitive with respect to the size of the pressure offtakes. Finally, nozzle and venturi devices are relatively complex from a manufacturing standpoint.

The normal orifice-plate, which generally uses pressure offtakes in the wall of the conduit, has no such shaped upstream section and is generally less subject to unpredictable instability. The orifice-plate constitutes a dam which produces abrupt changes in the velocity and direction of the flow stream. A high velocity jet is formed which has a plane of minimum contraction, the vena contracta where the stream lines are parallel, just downstream of the plate. The position of this plane will vary with the area ratio between the orifice and conduit and with the rate of flow. The area of the jet at the plane of the downstream face of the plate and the pressure at an offtake in this plane will thus also vary, thereby producing changes in the value and characteristics of the coefficient of discharge.

Moreover, the rapid contraction produced by the orifice causes the average value of the discharge coefficient to be much lower than that of a nozzle or venturi tube. The coefficient of contraction for an orifice is of the order of 0.63, as compared with near unity for a nozzle or venturi tube. The other component of the discharge coefficient, namely the coefficient of velocity, is roughly the same in both cases.

From a practical standpoint, this means that, for a given set of flow conditions, an orifice will need a meter with a larger differential head than will a nozzle or venturi tube. Also the irrecoverable pressure loss, expressed as a percentage of the differential head, will be greater.

In the case of a venturi tube, a diffuser assists in re-conversion of kinetic to potential energy. In the case of an orifice plate without a diffuser, the high velocity jet begins to expand beyond the plane of the vena contracta and in so doing creates turbulent secondary areas of flow behind the plate. In fact, it is the "eating" into the jet by this turbulence which eventually slows it down and thus effects re-conversion of kinetic to potential energy. The decay of the jet is thus achieved in an inefficient manner, part of the available energy being lost as heat, and the irrecoverable pressure loss is high.

One object of the present invention is to provide a device which combines properties of the orifice plate, namely stability or reliability of performance and simplicity and, particularly, linearity of the discharge-coefficient curve with properties associated with nozzle and venturi-tube devices, particularly as regards pressure recovery.

According to the invention, in a flow-measuring device of the kind hereinbefore set forth, particularly but not exclusively an orifice plate, a fence element embracing the opening but spaced, transversely of the conduit, from the said opening and the conduit wall projects upstream from the upstream face of the transverse wall, the height of the fence element (that is its dimension axially of the conduit) being within the range of 0.06 and 0.35 of the width of the conduit and its thickness being not greater than its height, while the width embraced by the fence is within the range of 1.02 to 1.80 of the width of the opening.

In such a device, advantageously, the upstream pressure offtake, whether a single-hole or annular offtake, opens at the wall of the conduit or at a position between the said wall and the outer surface of the fence element.

If the conduit is cylindrical and the opening circular, as in the case of a normal orifice plate, the fence element may take the form of a collar or ring concentrically surrounding the opening completely or in large part. Respective diameters will then constitute the widths referred to above. The inside diameter of the collar or ring should not be greater than 1.40 of the diameter of the opening.

In such a device, due to the contact with the approaching fluid of an edge spaced axially and radially from the effective edge of the opening, acceleration and guidance of the flow stream is achieved before the plane of the upstream face of the opening is reached. It is therefore possible to modify the value of the discharge coefficient within wide limits and at the same time to improve the linearity of its curve and other general characteristics over a wide range of Reynolds numbers and for the usual range of area ratios. A more even distribution of velocity is obtainable at the plane of the downstream pressure off-take and this tends to give a less pronounced vena contracta and to prevent the position of this vena contracta from varying as much as it does with the normal orifice plate. The effect of the collar or ring is probably to create upstream of the opening a stable flow having a profile very similar to that of the inlet section of a venturi tube, with the advantage that there is a fluid to fluid contact at this profile, rather than a fluid to metal contact.

Figure 7:
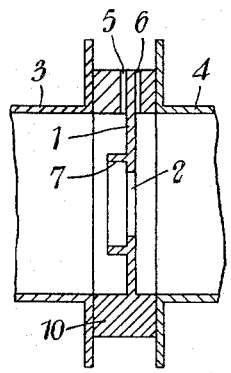
Figure 8:
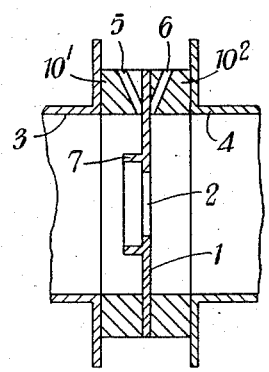
Figure 9:
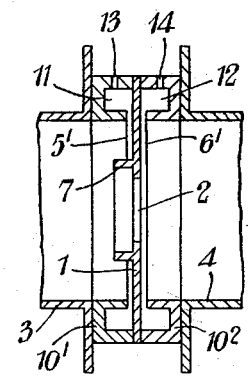
Figure 10:
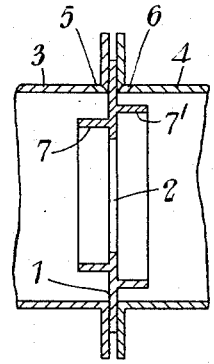
Figure 11:
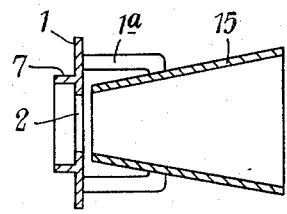
Figure 12:
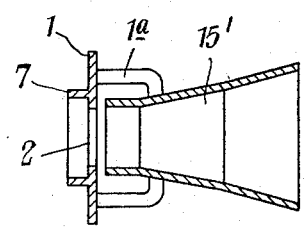
Figure 13:
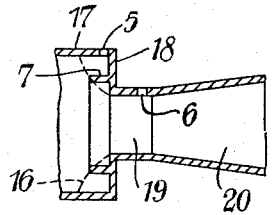
Figure 14:
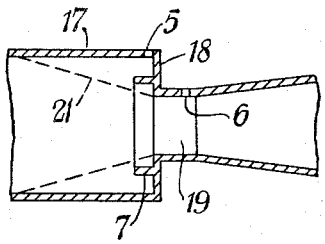
Figure 15:
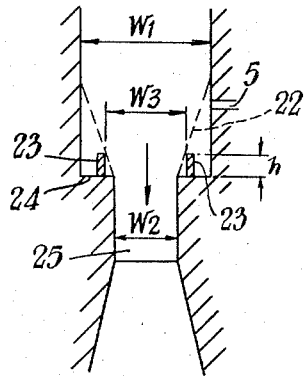
Figure 17:
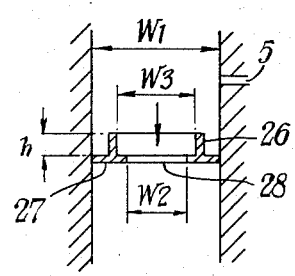
Figure 16:
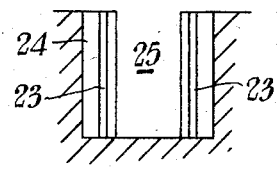
Figure 18:
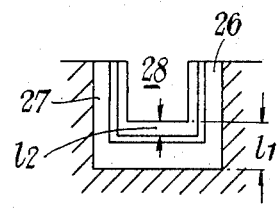

Various ways of carrying the invention into effect will now be more fully described by way of example and with reference to the accompanying diagrammatic drawings, in which:

Figure 1 is a longitudinal section through an orifice-plate device mounted in a pipe, Figure 2 an elevation of the orifice plate to a smaller scale, Figures 3 and 4 views similar to Figures 1 and 2 of an alternative arrangement of orifice plate, Figure 5 a section through a modified form of orifice, Figures 6a–6g sections illustrating alternative forms of ring, Figures 7–9 part sections illustrating alternative forms of pressure offtakes, Figure 10 a section of a further form of orifice plate, Figures 11 and 12 sections illustrating the addition of alternative forms of diffuser, Figures 13 and 14 sections of modified venturi-tube and nozzle devices respectively, Figures 15 and 16 a horizontal section and end elevation of a modified flume device, and Figures 17 and 18 similar views of a weir-plate device.

Referring to Figures 1 and 2, a standard orifice plate 1 with an orifice 2 is disposed between upstream and downstream pipe sections 3 and 4. Pressure offtakes 5 and 6 to be connected to a differential-pressure measuring instrument, such as a manometer, are formed in the pipe sections substantially in the planes of the upstream and downstream faces of the plate 1 and opening towards the centre of the pipe. Projecting at right angles from the upstream face of the plate is a fence element in the form of a collar-like ring 7 concentric with the orifice 2 and with the pipe. The inside of the ring is machined smooth. The upstream face inside and outside the ring 7 is at right angles, as shown, or substantially at right angles to the axis of the conduit. The ring 7 may be integral with the plate 1 or separate and mounted on it. In some cases, there may be a slight gap between the said ring and plate. The plate may be clamped and sealed between flanges on the pipe sections 3, 4, as shown, or mounted in a carrier installed in the pipe line.

The proportional dimensions selected will depend in some measure upon the area ratio $$m = \frac{\text{Area of orifice}}{\text{Area of pipe}}$$

Values of $m$ not exceeding 0.7 will normally be employed.

The height $h$ of the ring 7 should be within the range of 0.06D and 0.35D, where D is the internal diameter of the upstream pipe section, the larger values being selected for larger values of D. A suitable proportional value for an average case would be 0.125D.

The inside diameter $d_r$ of the ring should be within the range of $1.02d_o$ to $1.40d_o$, where $d_o$ is the diameter of the orifice.

For a given ring height $h$ of medium value within the range quoted above, larger values of $d_r$ within the range just stated will normally be associated with lower values of the area ratio $m$. For a given ring diameter $d_r$, the value of the coefficient of discharge increases as $m$ is reduced. For a given ring height $h$ and a given value of the coefficient, larger values of $m$ will normally be associated with smaller values of $d_r$.

The thickness of the ring should be not greater than its height and within the range of $0.004\ d_o$ to $0.05\ d_o$, the smaller values being normally used with orifices in larger pipes. The axial dimension of the orifice bore should be approximately $0.05\ d_o$ for values of $m$ less than 0.36 and $0.025\ d_o$ for values of $m$ greater than 0.36. Generally the said thickness and axial dimension may be equal. The total thickness of the orifice plate should not be greater than 0.05D.

The diameter of the pressure offtakes should not normally exceed 0.03D.

Using these dimensional ranges, values of the coefficient of discharge within the range 0.65 to 0.93 can be obtained. The coefficient will in any case have a high degree of linearity, that is to be substantially constant over a wide range of Reynolds numbers. Generally, the lower proportional values of $h$ will be used for smaller values of D. If, however, the aforesaid value of $h=0.125$D is used for small pipes, the coefficient will be found to be about 2% higher than for large pipes, but the linearity is maintained.

By way of example, an orifice plate for a 6" pipe and with an area ratio $m=0.5$ would suitably have a ring whose inside diameter $d_r$ is 4.61" and height $h$ 0.75", the thickness of the ring and the axial dimension of the orifice bore being 0.125". With these dimensions, a discharge coefficient of 0.845 can be obtained.

Normally the diameter of the upstream and downstream pipe sections 3, 4 will be equal, but it is believed that the device will not be very sensitive to this condition.

The ring 7 need not completely surround the orifice 2, particularly if the orifice is eccentric or even tangential to the bore of the pipe. In this case, as shown in Figures 3 and 4, the ring 7 is still made concentric with the orifice 2, but is interrupted where the ring and pipe wall would interfere. The pressure offtakes 5, 6 may be disposed at either of the positions shown in Figure 4.

In Figures 1 and 3, the orifice 2 is shown with a conventional square-edged parallel bore. The bore may, however, have a chamfer 8 on the downstream side, as shown in Figure 5 and/or on the upstream side. In this case, the proportional orifice dimensions referred to above apply to the parallel section of the bore. In Figures 1 and 3, moreover, the edge of the ring facing upstream is also square, that is the ring has a rectangular cross-section. However, the section need not be rectangular and, as illustrated in Figure 6, the edge may be chamfered (a, b) or partially chamfered (c, d) or stepped (e, f) at either the inner or outer corner or rounded (g). In all such cases, the inside of the ring will be parallel to the axis over at least half of the height $h$. Furthermore, although a continuous edge is preferable, the free edge of the ring may be castellated, for example with slots of a width equal to twice the height $h$ of the ring, without any great loss of linearity of the discharge coefficient. Finally, the corners 9, shown square in Figures 1 and 3, may be radiused or provided with fillets.

Other arrangements and forms of pressure offtakes 5, 6 may be employed. For example, as shown in Figure 7, they may be arranged in an annular carrier 10 which is integral with the plate 1 and which has bores of the same diameter as the pipe sections 3, 4 between which the carrier is clamped. Alternatively, as shown in Figure 8, they may be arranged in two annular members 10¹, 10² between which the plate 1 is clamped with a similar result. Moreover, whether in the pipe wall or in one or two separate members such as 10 or 10¹, 10², single-bore offtakes or tappings 5, 6 may be replaced by annular-gap offtakes 5', 6' such as are shown in Figure 9. The offtakes open into annular ducts or chambers 11, 12 or piezometer rings which are in turn to be connected to the instrument through bores 13, 14. In all these cases, the mouths of the offtakes are at a distance of D/2 from the central axis. One or both of the pressure offtakes may be arranged otherwise than in the plane of the respective face of the plate 1. For example, they may be displaced axially to distances of D upstream and D/2 downstream or to other well-known positions. The discharge coefficient values and characteristics will, however, be affected by such displacement.

Instead of opening substantially towards the centre of the pipe, the offtakes may open substantially in directions parallel to the axis of the pipe or may even open towards the wall of the pipe. The offtakes may be formed by one or more holes or slits in the faces of the orifice plate between the ring and the wall of the pipe or, in the case of the upstream offtake, in the outside of the ring or, indeed may open at any other point between the ring and the wall. Such offtakes may be connected to the outside of the pipe directly by passages or indirectly by way of annular ducts or piezometer rings. In some cases, only an upstream or a downstream pressure offtake may be required.

As illustrated in Figure 10, rings 7, 7' may be provided on both the upstream and downstream faces of the plate 1. This arrangement allows of the measurement of flow rates in either direction, even if they are substantially different, without the necessity to change the size of the orifice 2 and/or to use two different instruments in conjunction with a change-over device. With the arrangement of Figure 10, the rings 7, 7' may be of different proportions and shapes, so that the differential-pressure range produced may be substantially the same for the two directions of flow.

Vent or drain holes may be provided in known manner in the orifice plate 1. Such holes may even be provided in the ring 7 itself without appreciably affecting the performance of the device, provided that the total area of the holes does not exceed 2% of the area of the orifice 2.

For devices such as have been described, the general flow formulae normally used (for example those given in British Standards Specification 1042:1943) may be applied without material alteration. However, the expansion factor, for compressible fluids, given for orifices is not applicable and a factor between those for orifices and venturi tubes must be adopted.

Although an improved pressure recovery is obtained with devices such as have been described, additional recovery is attainable by associating an outlet diffuser with the orifice plate. As illustrated in Figure 11, a diffuser 15 may consist of a simple diverging cone with an apex angle between 7° and 15°. Suitably and as illustrated, the cone is supported from the plate 1 by a few webs 1a. In some cases, a diffuser may consist of a complex cone comprising, say, a parallel section and two diverging sections with different apex angles, as for example in the case of the diffuser 15' shown in Figure 12. It is believed that no advantage will be obtained by making the diameter of the inlet mouth of the diffuser or of its parallel section less than the diameter $d_o$ of the orifice 2 and, as illustrated, it is slightly larger than $d_o$. If the distance of the said mouth from the downstream face of the orifice plate 1 is not less than $0.25\ d_o$, the diffuser will not materially affect the value or linearity of the discharge coefficient.

However, if pressure recovery is of greater importance than linearity of the discharge coefficient over a wide flow range, further improvement in the recovery may be obtained by disposing the diffuser with its mouth nearer the downstream face of the plate. Indeed, a diffuser which is integral with the plate and has the downstream pressure offtake in the diffuser wall itself, still in the plane of the downstream face of the plate, can be used with no greater loss of linearity in the lower part of the Reynolds-number range than is already associated with standard orifice-plate devices.

The preceding examples are concerned with the application of the invention to orifice plates. The invention may, however, be similarly applied to other flow-measuring devices used in either closed or open conduits and comprising an opening in a transverse wall across the conduit. In such cases also, the flow stream on the upstream side of the device is modified and the characteristics of the discharge coefficient, such as the linearity thereof, can be improved.

Thus, in effect, the invention can be applied to a venturi-tube device. As illustrated in Figure 13, this may be effected by eliminating the shaped inlet portion 16 of the said device and disposing a ring 7, within a cylindrical pipe section 17, on the upstream face of a wall 18 from which the remaining throat portion 19 and diffusing portion 20 of the device extend downstream. The proportional dimensions for the ring 7 will be the same as for the orifice plate, $d_o$ being the diameter of the throat entry. As illustrated in Figure 14, a nozzle device may be similarly dealt with, the conical inlet section 21 being eliminated.

In the case of a venturi-flume in an open conduit, such as is shown in Figures 15 and 16, the inlet section 22 is eliminated and a fence element in the form of two projecting edges 23 is provided on the upstream face of the transverse wall 24 from which the throat section 25 extends. The proportional dimensions of the fence element will then be referred to the respective horizontal widths $w_1$, $w_2$ and $w_3$, instead of to diameters as in the previous cases: $h$ will be within the limits of $0.06w_1$ and $0.35w_1$, $w_3$ will be within the limits of $1.02w_2$ and $1.8w_2$.

Rectangular-notch and V-notch weirs can be modified by the addition of a fence element in the form of a partial collar 26, as illustrated in Figures 17 and 18 for the case of a standard contracted weir plate 27 with a rectangular notch 28. Again the proportional dimensions will be referred to the widths, $h$ lying within the same limits: $w_3$ will lie within the limits of $1.02w_2$ and $1.80w_2$.

In addition, the vertical dimension $l_2$ should lie within the limits of $0.02l_1$ to $0.80l_1$ (Figure 18).

I claim:

1. A fluid-flow measuring device of the kind set forth, comprising a wall extending transversely of the conduit and having an opening therein and a fence element which embraces the opening but is spaced, transversely of the conduit, from the said opening and the conduit wall and which projects upstream from the upstream face of the transverse wall, the height of the fence element being within the range of 0.06 and 0.35 of the width of the conduit and its thickness being not greater than its height, while the width embraced by the fence element is within the range of 1.02 to 1.80 of the width of the opening.

2. A fluid-flow measuring device of the kind set forth, for use in a cylindrical conduit, comprising a wall extending transversely of the conduit and having a circular opening therein and a fence element which embraces the opening in the form of a collar but is spaced diametrically from the said opening and the conduit wall and which projects from the upstream face of the transverse wall, the height of the fence element being within the range of 0.06 and 0.35 of the diameter of the conduit and its thickness being not greater than its height, while the internal diameter of the fence element is within the range of 1.02 to 1.40 of the diameter of the opening.

3. A device as claimed in claim 2, wherein the fence element has the form of a ring embracing said opening in said transversely extending wall and is concentric with said opening.

4. A device as claimed in claim 1, wherein the thickness of the fence element is within the range of 0.004 to 0.05 of the width of the opening.

5. A device as claimed in claim 1, wherein the dimension of the opening parallel to its axis is within the range of 0.025 to 0.05 of the width of the opening.

6. A device as claimed in claim 1 and having a fence element as claimed projecting from both faces of the transverse wall.

7. A device as claimed in claim 1 in combination with a diffuser on the downstream side of the transverse wall.

References Cited in the file of this patent

UNITED STATES PATENTS

| | | |
|---|---|---|
| 1,298,532 | Mapelsden | Mar. 25, 1919 |
| 1,904,333 | Smith | Apr. 18, 1933 |